(12) United States Patent
Hughes et al.

(10) Patent No.: US 11,953,218 B2
(45) Date of Patent: Apr. 9, 2024

(54) PRIORITIZNG EFFICIENT OPERATION OVER SATISFYING AN OPERATIONAL DEMAND

(71) Applicant: Trane International Inc., Davidson, NC (US)

(72) Inventors: John Hughes, Flint, TX (US); Thomas B. Krugler, Jacksonville, TX (US); Youssef A. Jaber, Tyler, TX (US); Steven Brooks, Overton, TX (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 18/056,105

(22) Filed: Nov. 16, 2022

(65) Prior Publication Data

US 2023/0096424 A1    Mar. 30, 2023

Related U.S. Application Data

(63) Continuation of application No. 16/367,044, filed on Mar. 27, 2019, now Pat. No. 11,525,593.

(51) Int. Cl.
*F24F 11/47* (2018.01)
*F24F 11/63* (2018.01)
*G06F 9/50* (2006.01)
*F24F 140/60* (2018.01)

(52) U.S. Cl.
CPC .............. *F24F 11/47* (2018.01); *F24F 11/63* (2018.01); *G06F 9/5005* (2013.01); *F24F 2140/60* (2018.01)

(58) Field of Classification Search
CPC ........................................................ F24F 11/63
See application file for complete search history.

(56) References Cited

U.S. PATENT DOCUMENTS

| | | | |
|---|---|---|---|
| 6,349,883 B1* | 2/2002 | Simmons ................. | F24F 11/62 236/51 |
| 8,185,245 B2 | 5/2012 | Amundson et al. | |
| 8,204,628 B2 | 6/2012 | Schnell et al. | |
| 8,326,466 B2 | 12/2012 | Peterson | |
| 8,538,586 B2 | 9/2013 | Amundson et al. | |
| 2005/0005621 A1 | 1/2005 | Jayadev | |
| 2007/0227721 A1 | 10/2007 | Springer et al. | |
| 2008/0221737 A1* | 9/2008 | Josephson ............... | H04L 67/02 707/999.005 |
| 2009/0132176 A1 | 5/2009 | McConnell et al. | |
| 2010/0106332 A1 | 4/2010 | Chassin et al. | |
| 2011/0264932 A1 | 10/2011 | Park et al. | |
| 2012/0029725 A1 | 2/2012 | Lafleur et al. | |
| 2013/0178985 A1 | 7/2013 | Lombard et al. | |
| 2014/0049545 A1 | 2/2014 | Losee et al. | |
| 2014/0277769 A1 | 9/2014 | Matsuoka et al. | |
| 2015/0142194 A1 | 5/2015 | Dyess et al. | |
| 2015/0221030 A1 | 8/2015 | Aganagic | |
| 2016/0025364 A1 | 1/2016 | Mills, Jr. et al. | |

(Continued)

*Primary Examiner* — Nathan L Laughlin
(74) *Attorney, Agent, or Firm* — WOMBLE BOND DICKINSON (US) LLP

(57) ABSTRACT

Architectures or techniques are presented that can prioritize operating a consumption device in a manner that is efficient in terms of consumption of a resource over satisfying a specified demand assigned to the consumption device. This re-prioritizing can be performed in response to a price of the resource exceeding a threshold.

17 Claims, 9 Drawing Sheets

(56) References Cited

U.S. PATENT DOCUMENTS

| | | |
|---|---|---|
| 2016/0069599 A1 | 3/2016 | Izadi-Zamanabadi et al. |
| 2016/0313753 A1 | 10/2016 | Liu |
| 2017/0211831 A1 | 7/2017 | Watson |
| 2017/0363312 A1 | 12/2017 | Crimins et al. |
| 2017/0364105 A1 | 12/2017 | Greene et al. |
| 2020/0217545 A1 | 7/2020 | Favaloro et al. |
| 2020/0309396 A1 | 10/2020 | Hughes et al. |
| 2021/0184618 A1 | 6/2021 | Tsuchiya et al. |

* cited by examiner

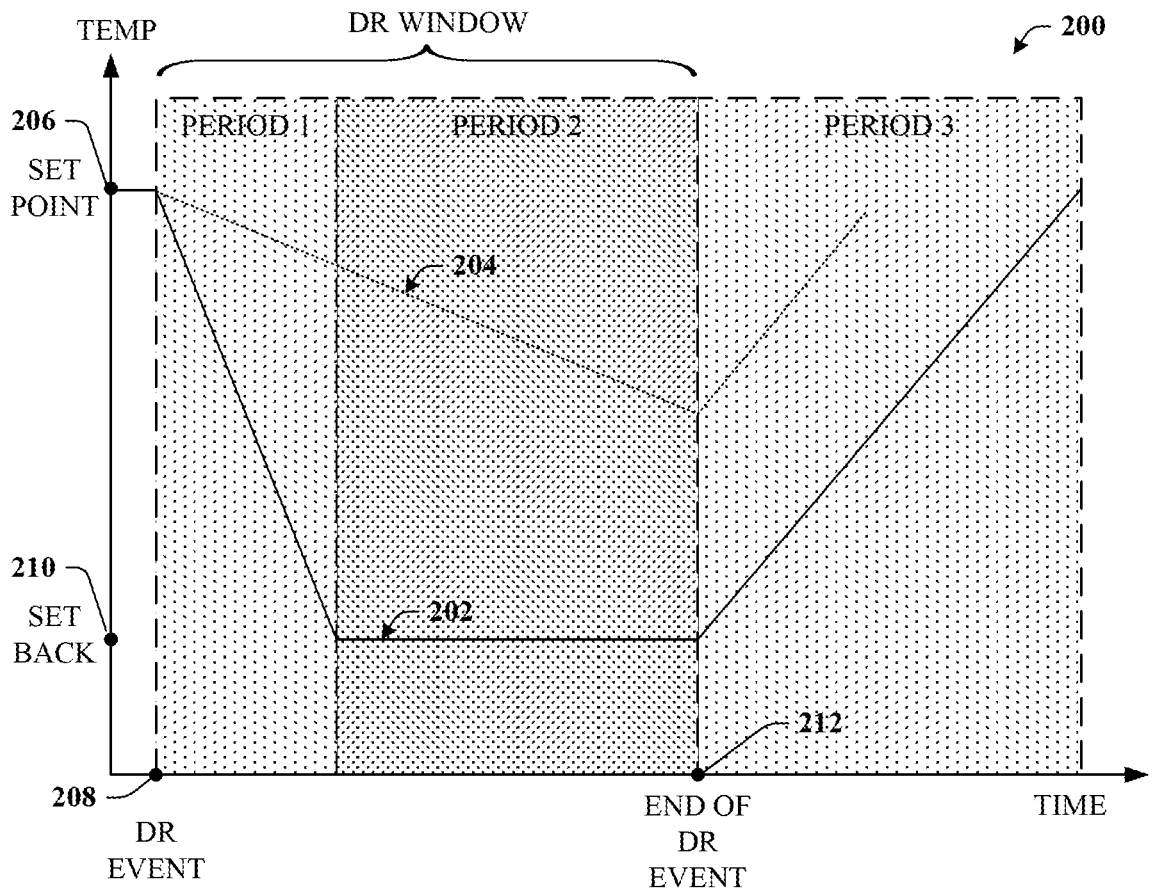

COMPARISON SUMMARY

| PERIOD 1: | PERIOD 2: | PERIOD 3: |
|---|---|---|
| 202: SETPOINT MOVED TO SETBACK. EQUIP STAYS OFF WITH NO CONSUMPTION, BUT TEMP RAPIDLY APPROACHES SETBACK, THE LEVEL OF MAX DISCOMFORT | 202: TEMP HAS REACHED SETBACK, SO DISCOMFORT LEVEL IS MAXIMIZED, AND RESOURCE CONSUMPTION IS HIGH TO MAINTAIN SETBACK | 202: DR EVENT HAS ENDED, BUT COST, DURATION, AND CONSUMPTION TO RECOVER FROM SETBACK TO SETPOINT IS HIGHER |
| 204: EQUIP RUNS AT HIGH EFFICIENCY, CONSUMING SOME RESOURCE, BUT COMFORT LEVEL/TEMP DOES NOT DEGRADE RAPIDLY | 204: EFFICIENCY PRIORITIZED VS SATISFYING A SETPOINT, SO SAME RESULTS AS PERIOD 1 | 204: CONSUMPTION AND COST TO RECOVER IS LOWER. |

FIG. 2

PRIORITIZNG EFFICIENT OPERATION OVER SATISFYING AN OPERATIONAL DEMAND

CROSS-REFERENCE TO RELATED APPLICATION

The present patent application is a continuation of U.S. patent application Ser. No. 16/367,044, filed Mar. 27, 2019, entitled "Prioritizing Efficient Operation Over Satisfying An Operational Demand," which is incorporated by reference herein in its entirety and for all purposes.

TECHNICAL FIELD

The present disclosure is directed to systems, apparatuses, and methods for prioritizing efficient operations of a resource consumption device (e.g., a heating, ventilation, and air conditioning device) over satisfying an operational demand (e.g., a set point or setback) of the device.

BACKGROUND

In the energy domain, resource prices can vary significantly as a function of supply and demand. Networks were established according to standards (e.g., Open Automated Demand Response or OpenADR) to permit signaling customer devices in real time to help manage resource demand spikes. OpenADR standards also permit providing energy prices to connected devices (e.g., energy customer devices).

Actions taken in response to signals provided through OpenADR are generally the result of negotiations between a particular resource provider and customers of that resource provider. In a known example, the resource provider may trigger a demand response (DR) event during a period of peak demand for the resource. The resource provider is highly motivated to reduce resource consumption during those DR events, while customers are highly motivated by their own comfort levels. A typical compromise between these two competing goals has been to incentivize customers in some way to agree to reducing consumption during DR events.

The traditional approach by resource providers has been to implement a setback setting to be used during DR events triggered by the response provider. For example, when a DR event occurs, a thermostat setting for an air conditioning device is moved from the customer set point (e.g., 72 degrees) to some higher setback setting (e.g., 76 degrees). Hence, the operational demands of the air conditioner device can be reduced during the DR event, which reduces resource consumption during the DR event at a cost of some customer discomfort.

While the above solution does provide advantages, some disadvantages can arise, which can lead to one or more technological problems. It is believed these additional issues or technological problems are heretofore unknown or unrecognized.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that can respond to a DR event by prioritizing efficient consumption of a resource over satisfying an operational demand are described.

According to an embodiment of the present disclosure, a system can comprise a processor and a memory that stores executable instructions that, when executed by the processor, facilitate performance of operations. The executable instructions can comprise interfacing to a consumption device. The consumption device can be configured to consume a resource in order to satisfy an operational demand. The executable instructions can further comprise determining that a price of the resource exceeds a defined price threshold. In response to that determination, the executable instructions can comprise instructing the consumption device to switch a mode of operation. Switching the mode of operation can comprise, switching from a nominal mode that is determined to prioritize satisfying the operational demand, to a reduced capacity mode that is determined to prioritize efficient consumption of the resource over satisfying the operational demand.

In some embodiments, elements described in connection with the system can be embodied in different forms such as a computer-implemented method, a computer-readable medium, or another form.

DESCRIPTION OF THE DRAWINGS

FIG. 2 illustrates a graph demonstrating an example comparison between setback techniques that prioritize satisfying a set point versus the disclosed techniques that can prioritize efficient operation over satisfying the set point in accordance with one or more embodiments of the disclosed subject matter;

DETAILED DESCRIPTION

Overview

Figure 1:
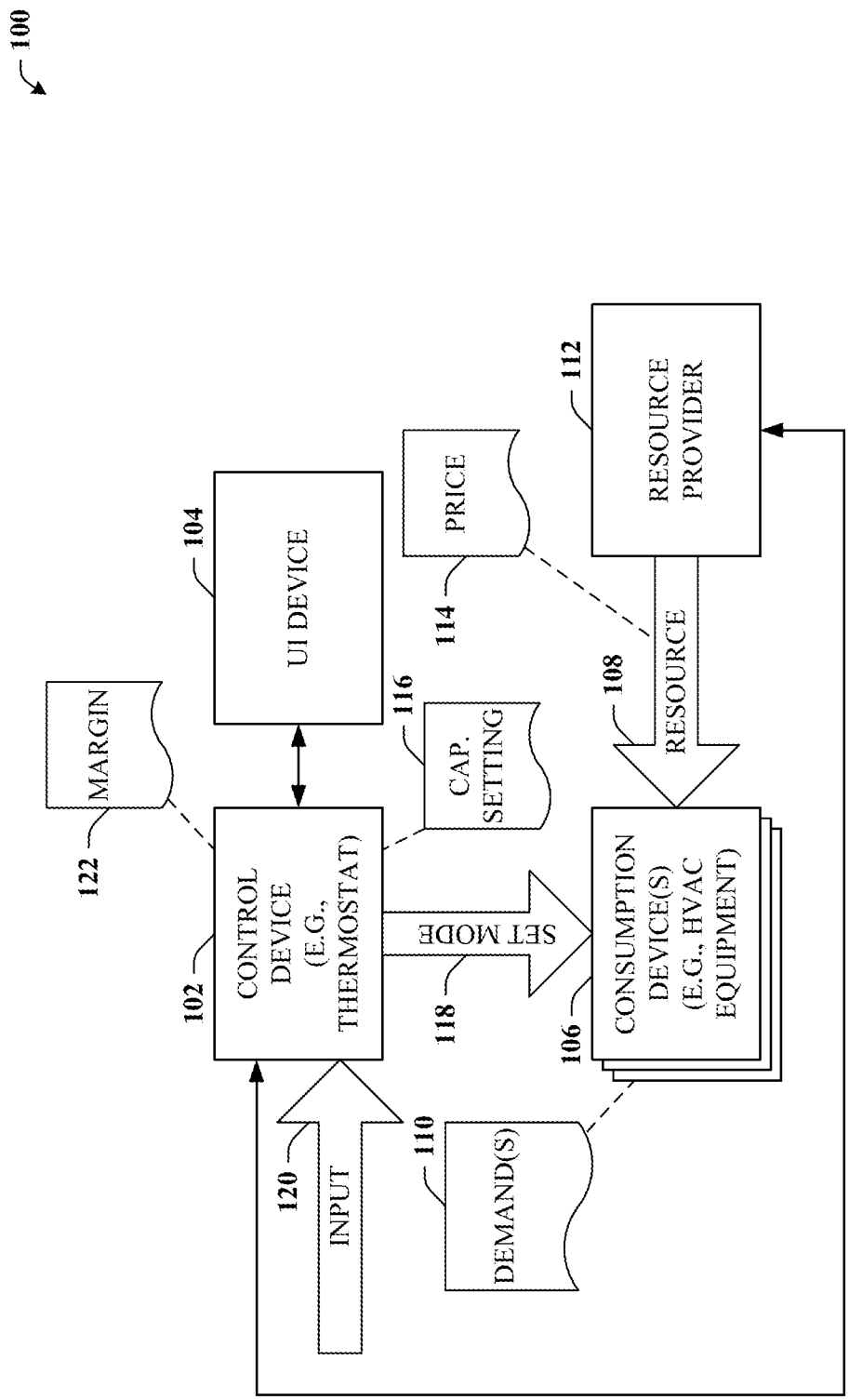
FIG. 1 illustrates a block diagram of a non-limiting system that can, e.g., in response to a demand response (DR) event, facilitate prioritizing efficient operation of a resource consumption device over satisfying a set point in accordance with one or more embodiments of the disclosed subject matter.

As noted in the background section, the traditional approach by resource providers to managing resource consumption during DR events is to implement setbacks, e.g., backing the set point off to a setback value that reduces the demands placed on a resource consumption device such as a heating, ventilation, and air conditioning (HVAC) device. Employing setbacks in response to the DR event can operate to reduce consumption during the peak demand window, but typically cause a commensurate increase in consumption during a recovery period immediately after the DR event. Immediately after the DR event, during the recovery period, the device is switched back to the original set point, having the effect of increasing the demands, and by proxy resource consumption, at the conclusion of the DR event. Moreover, during the DR event, it is highly likely that a customer's comfort level will be diminished by the difference between the set point and the setback. Thus, conventional solutions do have potential drawbacks.

In addition to the above-mentioned drawbacks, the inventors have observed that while implementing a setback solution may shift consumption to a later time (e.g., shift some consumption from a DR event period to a post-DR period), the priorities of the devices remain the same at all times. Before, during, and after a DR event, the priority of the consumption device is assigned to satisfying a particular set point, be it the original set point programmed by the customer or the setback that is instituted during DR events. The inventors believe that a better solution can be provided by changing this paradigm of prioritizing satisfaction of a set point to prioritizing efficient operation and/or efficient resource consumption.

For example, consider a conventional scenario in which a heating device is programmed by the customer with a set point of 72 degrees. During normal operations, the only significant priority of the heating device is to maintain the temperature at or near 72 degrees. When the temperature is at or above 72 degrees, the heating device switches off, and switches on again when below 72 degrees. During a DR event, the temperature set point is set back four degrees to 68 degrees, however, operation of the heating device proceeds in the same way and the priorities of the heating device remain the same, albeit with a different set point value.

The disclosed subject matter introduces a different paradigm in thinking in how to respond to a DR event. For instance, rather than prioritizing satisfaction of a set point during a DR event, prioritizing instead operational efficiency. The use of setbacks, as done conventionally, implicitly includes a willingness on the part of the customer to deemphasize satisfaction of the customer-desired set point. Conventional systems use this compromise from the customer to merely cycle the device off while the temperature drifts from the original set point to the setback temperature, which serves to shift consumption from a present time (e.g., the beginning of the DR event) to a later time (e.g., post-DR event).

In contrast, techniques disclosed herein propose rather than simply cycling a device off in response to a DR event until the temperature reaches the setback level (e.g., the maximum indicated level of customer discomfort), allow the device to continue operation, but in a reduced capacity mode and/or an efficient consumption mode. In other words, deemphasize satisfying a temperature set point, whether the original customer-input set point or the setback, and instead prioritize efficient operation.

It is observed that the primary goal of DR events is to reduce consumption of the resource during peak price times. It is further observed that reducing consumption at any time is a worthwhile goal. Conventional setback solutions tend to defer some consumption from a DR event time to a subsequent time, which is a useful result. However, when including the recovery period, conventional setback solutions do not reduce overall consumption and may actually increase overall consumption. As is further illustrated in FIG. 2, the disclosed techniques may consume more of the resource than setback solutions at initial stages of a DR event window. For instance, while setback solutions cycle the device off until the temperature reaches the setback, the disclosed techniques can continue operation, but in a high efficiency mode, which can be more efficient in terms of consumption of the resource. As a result, overall consumption during the DR window and in the aggregate (e.g., including the recovery period) can be significantly reduced, which is an advantageous result for the resource provider.

Further, from the customer's perspective, comfort levels can be significantly better during the DR window and, in fact, may not be diminished at all or only marginally so in many cases. Such can result in increased customer goodwill as well as increased participation in DR event programs, which can lead to a more flexible and robust ecosystem that can be simpler and more efficiently managed and more resistant to systemic shocks or failures.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawings, with initial reference to FIG. 1, a block diagram of an example non-limiting system 100 is depicted. In some embodiments, system 100 can, e.g., in response to a demand response (DR) event, facilitate prioritizing efficient operation of a resource consumption device over satisfying a set point in accordance with one or more embodiments of the disclosed subject matter. It is understood that nominal operation of resource consumption devices tends to prioritize satisfying a set point over other considerations such as efficiency or resource consumption. Previous techniques for responding to a DR event, such as implementing setbacks, change the set point but otherwise maintain this paradigm, which can lead to several drawbacks, as detailed herein.

It should be understood that in the discussion of the present embodiment and of embodiments to follow, repetitive description of like elements employed in the various embodiments described herein is omitted for sake of brevity. System 100 can comprise a processor and a memory that stores executable instructions that, when executed by the processor, facilitate performance of operations. Examples of said processor and memory, as well as other suitable computer or computing-based elements, can be found with reference to FIG. 9, and can be used in connection with implementing one or more of the systems or components shown and described in connection with FIG. 1 or other figures disclosed herein.

System 100 can comprise control device 102 such as a thermostat or other control device and user interface (UI) device 104 that can be utilized (e.g., by a customer) to provide inputs to or otherwise interact with control device 102. Control device 102 can communicate with and/or control other elements of system 100, potentially in response to input to UI device 104. For example, control device 102 can interface with consumption device 106 and/or control or communicate with consumption device 106.

Consumption device 106 can be any suitable device that is configured to consume a resource 108 in order to satisfy one or more operational demands 110. A representative, though non-limiting, example of consumption device 106 can be a heating, ventilation, and air conditioning (HVAC) device. A representative, though non-limiting, example of demand 110 can be a set point, generally a temperature set point, but other set points (e.g., humidity, output level, etc.) are envisioned depending on a type or characteristics of consumption device 106. Resource 108 can be any suitable resource such as water, air, gas, electricity, steam (WAGES), etc.

Hence, the disclosed techniques can be useful to a wide variety of implementations, but to provide a concrete illustration, a representative example used for the remainder of this document relates to control device 102 interfacing with an HVAC device (e.g., consumption device 106) configured to consume resource 108 from resource provider 112 in order to satisfy a temperature set point (e.g., demand 110).

In operation, resource 108 can have price 114 that can reflect a cost per unit of resource 108. In many cases, price 114 can be supplied to system 100 (e.g., supplied to control device 102 and/or consumption device 106) by resource provider 112 or another source, which can be in accordance with OpenADR standards. As noted, such standards define techniques to deliver information (e.g., peak price situations), but do not specify what actions to take. In conventional systems, the actions specified generally involve responding to the DR event by adjusting a set point from one value to another (e.g., changing the customer programmed set point to a setback value) that reduces the demand. For instance, for a heating device, less of the resource is needed to satisfy the demand of maintaining a temperature set point of 68 degrees (e.g., the setback value) than maintaining a set point of 72 degrees (e.g., the original set point). Therefore, consumption of the resource can be reduced during the period where the setback value is implemented.

Given that when a DR event begins, the temperature of a controlled environment will typically be about the current set point value, setback techniques allow the device to cycle off, consuming no resources, until the ambient temperature adjusts to the setback value. This allows consumption of the resource that would otherwise be used to maintain a temperature at the set point to be deferred to a later time at the costs of: (1) recovery consumption after the DR event (e.g., bringing the temperature from 68 degrees back to 72 degrees) and; (2) possible customer discomfort while the temperature deviates from the set point. In contrast, the disclosed techniques can operate differently than conventional setback techniques.

For example, in response to receiving a signal to begin a DR event and/or determining that price 114 of resource 108 exceeds a defined price threshold, control device 102 can instruct consumption device 106 to switch a mode of operation. Switching the mode of operation can comprise switching from a nominal mode that is determined to prioritize satisfying the operational demand to a reduced capacity mode and/or a savings mode. This reduced capacity mode can be one that is determined to prioritize efficient consumption of the resource over satisfying the demand 110.

In other words, in response to a DR event, control device 102 can determine a capacity setting 116 that prioritizes consumption efficiency over meeting demand 110. Thereafter, control device 102 can set (e.g., set mode 118) consumption device 106 to operate at capacity setting 116. For example, a consumption device 106 capable of operating with variable capacity can be set to half capacity or another capacity setting 116 (e.g., 70%, 30%, etc.). When operating at reduced capacity, consumption device 106 may not be capable of satisfying demand 110 (e.g., a current set point), but the output can be much more efficient than nominal operational modes that are aimed at satisfying demand 110, be it a set point value or a reduced setback value. Such is further illustrated by FIG. 2, which can now be referenced in conjunction with FIG. 1. In some embodiments, capacity setting 116 does not include adjusting the customer's set point or otherwise implementing a setback FIG. 2 depicts graph 200. Graph 200 illustrates an example comparison, applicable to a heating device, between setback techniques that prioritize satisfying a set point versus the disclosed techniques that can prioritize efficient operation over satisfying the set point in accordance with one or more embodiments of the disclosed subject matter. In that regard, graph 200 represents temperature of an environment over time for a first curve 202 that exemplifies setback techniques and a second curve 204 that exemplifies techniques that prioritize efficiency. Graph 200 is logically divided into three periods, with periods one and two representing distinct portions of a time window for a DR event and period three representing a time window following the DR event (e.g., recovery period).

At time=0, it is assumed the temperature is being maintained at set point value 206 in both scenarios. Some later time 208, a DR event occurs, which begins period one. With regard to first curve 202, setback techniques are implemented. Thus, the value signifying the demand is reprogrammed from set point 206 to setback 210. Because set point 210 is lower than set point 206, the heating device can cycle off (or remain off) without consuming any of the resource. However, because the heating device is not producing output, the temperature degrades to setback 210.

When the temperature reaches setback 210, period two begins. It is noted that setback 210 may conceptually represent a maximum indicated level of discomfort that the customer is willing to tolerate. Thus, while the temperature remains at setback 210, such can mean the level of customer discomfort is maximized. As can be seen, the temperature can quickly degrade to this level during period one and remains at this level for the entirety of period two, which ends with the DR event at time 212. When the temperature passes setback 210, the heating device must switch on to satisfy this new, lower demand. During DR events, operation is typically at full capacity. As a result, for the full duration of period two, consumption can be high as the heating device maintains this setback value. Hence, the only significant reduction in consumption that is realized by setback techniques (e.g., curve 202) occurs during period one, and this reduction in consumption is causes increased consumption during the recovery period, as illustrated at period three. It is noted that conventional techniques, including setback techniques illustrated at curve 202, tend to exclusively prioritize satisfying a set point. During the DR event (e.g., periods one and two), the heating equipment is operated in a manner that prioritizes satisfying the setback 210 value. Both before and after the DR event, the heating equipment is operated to prioritize maintaining set point 206.

In contrast, consider now curve 204, which can be an example of the temperatures realized when operating a heating device according to the disclosed techniques in which efficient consumption of resource 108 can be prioritized over satisfying any set point. Hence, instead of cycling the equipment off at the beginning of a DR window, as is done conventionally to reduce consumption, the heating device can be programmed to operate in an efficient, lower capacity mode. Operation can continue in this manner for the entirety of the DR window, comprising both periods one and two. As a result, more of the resource is consumed during period one relative to setback techniques because the heating device is producing output rather than being turned off. However, consumption of the resource can be lower during period two, in which the heating device can be operated in the efficient reduced capacity mode rather than being operated at full capacity, which can occur when using setback techniques to maintain setback 210.

Advantageously, the aggregate consumption over the entire DR window can be significantly less than for setback techniques or other prior techniques. Moreover, additional benefits arise. For example, as can be seen, when using the disclosed technique, the temperature does not degrade as rapidly. Thus, at the end of the DR window (e.g., time 212), the temperature can be substantially higher than witnessed in curve 202. As a result, customer discomfort might be significantly reduced and the cost, consumption, and time to recover during period three (e.g., post-DR window) can all be lower.

As further observations, while not the case in this example, other examples can exist in which the reduced capacity mode is sufficient to maintain set point 206, which can minimize both customer discomfort and recovery after the DR event ends. In another example, the DR event might comprise a very long time and/or conditions might be exceedingly extreme such that the temperature for curve 204 eventually drops below set back 210. In some embodiments, when the DR event has a lengthy duration, switching to the reduced capacity mode might be implemented for only a portion of the entire DR event duration, for instance the portion in which price 114 is above the defined price threshold. It is further noted, in the case of a lengthy DR event duration, the reduction in consumption versus curve 202 would likely be even more significant, however, such would also mean that the temperature passes some customer indicated maximum level of discomfort. In that case, a similar threshold can be established in accordance with the disclosed subject matter to prevent the temperature from varying beyond some margin of comfort satisfaction from the customer's perspective, as further detailed in connection with FIG. 1.

Turning back to FIG. 1, as illustrated, control device 102 can receive input 120. Input 120 can be any suitable information or data, can be received from a variety of different sources, and is further detailed herein in connection with other elements. Recall that control device 102 can determine capacity setting 116 and then set consumption device 106 to operate according to the specified reduced capacity. Operational output for consumption device 106 may be lower than when being operated at or near full capacity, but consumption of resource 108 can be lower and more efficient. Furthermore, various triggering mechanisms can be used to make this switch from the nominal operating mode to the reduced capacity mode.

One example already noted is notice of a DR event triggered by the resource provider 112 for the purpose of reducing loading on the resource 108.

In other examples, the customer can generate his or her own DR event in order to optimize efficiency. For example, a triggering mechanism can be determining that price 114 of the resource 108 exceeds some defined price threshold, which may be set by the customer. In some embodiments, such a determination can be made in response to receiving a peak demand signal such as via an OpenADR network or otherwise. Receipt of the peak demand signal or other price data can be one example of input 120. In other embodiments, other input 120 might trigger the reduced capacity mode based on input to UI device 104 or consumption device 106, either of which can be forwarded to control device 102 as input 120. Such may take the form of setting the defined price threshold to a value below price 114 in response to receiving this signal. In some embodiments, such can be triggered by and/or represent a substitute for a user selecting an 'away' mode. For example, a when the customer selects an 'away' mode or similar (e.g., input 120), control device 102 can change the value of the defined price threshold to be below a current price 114, which can trigger the disclosed techniques. In some embodiments, price schedules for one or both price 114 or the defined price threshold can be received as input 120.

As further illustrated, control device 102 can further have access to satisfaction margin 122. Satisfaction margin 122 can identify an acceptable margin by which operation of consumption device 106 in the reduced capacity mode is permitted to under satisfy demand 110. Hence, satisfaction margin 122 can be set to, for example, 10% of demand 110 or, in the context of a temperature set point, four degrees, or the like. In some embodiments, satisfaction margin 122 can be determined by control device 102, potentially based on input 120, which can be, for example, supplied by the customer or user, based on suggestions from resource provider 112 or another source, promulgated by a ratings agency (e.g., EnergyStar), determined based on machine learning techniques, or another suitable technique.

In some embodiments, in response to determining that operation of consumption device 106 in the reduced capacity mode under satisfies demand 110 by at least satisfaction margin 122 (e.g., the temperature drops more than four degrees below the customer set point), control device 102 can instruct consumption device to switch modes. For example, consumption device 106 can be switched from the reduced capacity mode back to the nominal or full capacity operating mode, or switched to a different reduced capacity mode that provides a sufficient operational output to prevent satisfaction margin 122 from being violated.

Switching briefly back to FIG. 2, it can be observed that satisfaction margin 122 can thus serve the purpose of capping the amount of discomfort, similar to setback 210. Hence, even in the worst-case scenario, the disclosed techniques can reduce consumption of resource 108 and still cap the potential discomfort suffered by the customer. In other words, comfort levels realized by the customer can be no worse than conventional techniques, and will exist for a shorter duration, if at all. Further, the customer may realize a cost savings over conventional techniques while resource provider 112 can realize reduced consumption overall and, of particular importance, during the DR window.

Figure 3:
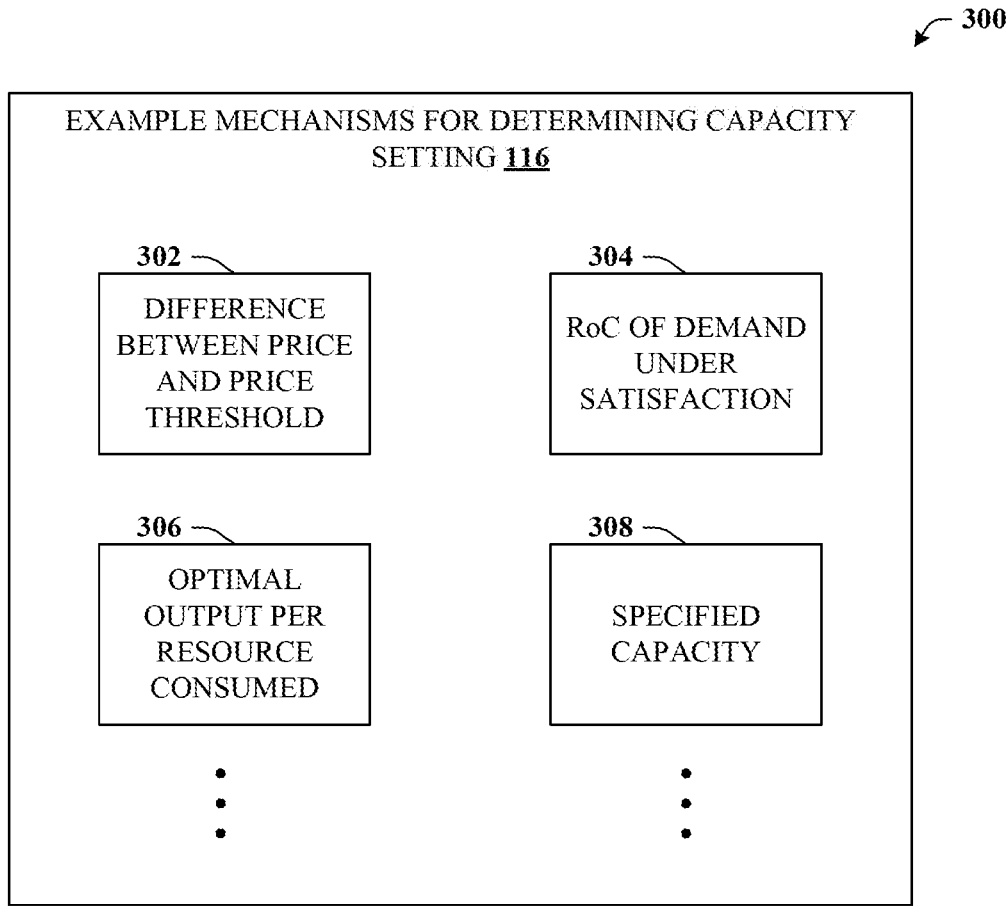
FIG. 3 illustrates a block diagram providing example mechanisms for determining the capacity setting in accordance with one or more embodiments of the disclosed subject matter.

Turning now to FIG. 3, a block diagram 300 is illustrated. Diagram 300 provides example mechanisms for determining capacity setting 116 in accordance with one or more embodiments of the disclosed subject matter. As has been discussed, control device 102 can set consumption device 106 to a reduced capacity mode. The reduced capacity mode can be one that prioritizes reduced consumption over satisfying a particular set point. Thus, the actual amount by which to reduce the capacity can be a wide range and can be determined according to a variety of techniques.

As one example indicated by reference numeral 302, the amount by which to reduce output capacity for consumption device 106 can be determined as a function of a difference between price 114 and the defined price threshold. For example, if the difference is large, then a different capacity setting 116 might be selected than cases where this difference is small. As another example indicated by reference numeral 304, the amount by which to reduce output capacity for consumption device 106 can be determined as a function of a rate of change by which the operational demand is under satisfied. For instance, if the temperature does not drift from the customer set point or does so very gradually, capacity setting 116 might be reduced further to capture even more efficient operation. Conversely, if the temperature changes relatively rapidly from the customer set point, capacity setting 116 might be updated to a setting that increases operational output nearer to nominal output, while still prioritizing efficient consumption of resource 108.

As illustrated by reference numeral 306, the amount by which to reduce output capacity for consumption device 106 can be determined to result in an optimal efficiency per unit of the resource consumed. At reference numeral 308, the amount by which to reduce output capacity for consumption device 106 can be specified by input 120 to the control device 102, consumption device 106, and/or UI device 104. It is understood that any of the above determinations can be performed based on other data that can be received as input 120 or otherwise available to control device 102. For example, determinations 302-308 can further be a function of device specifications of consumption device 106, thermodynamic models of the environment controlled by consumption device 106, current conditions (e.g., ambient temperature, weather forecasts, etc.), and so forth.

Figure 4:
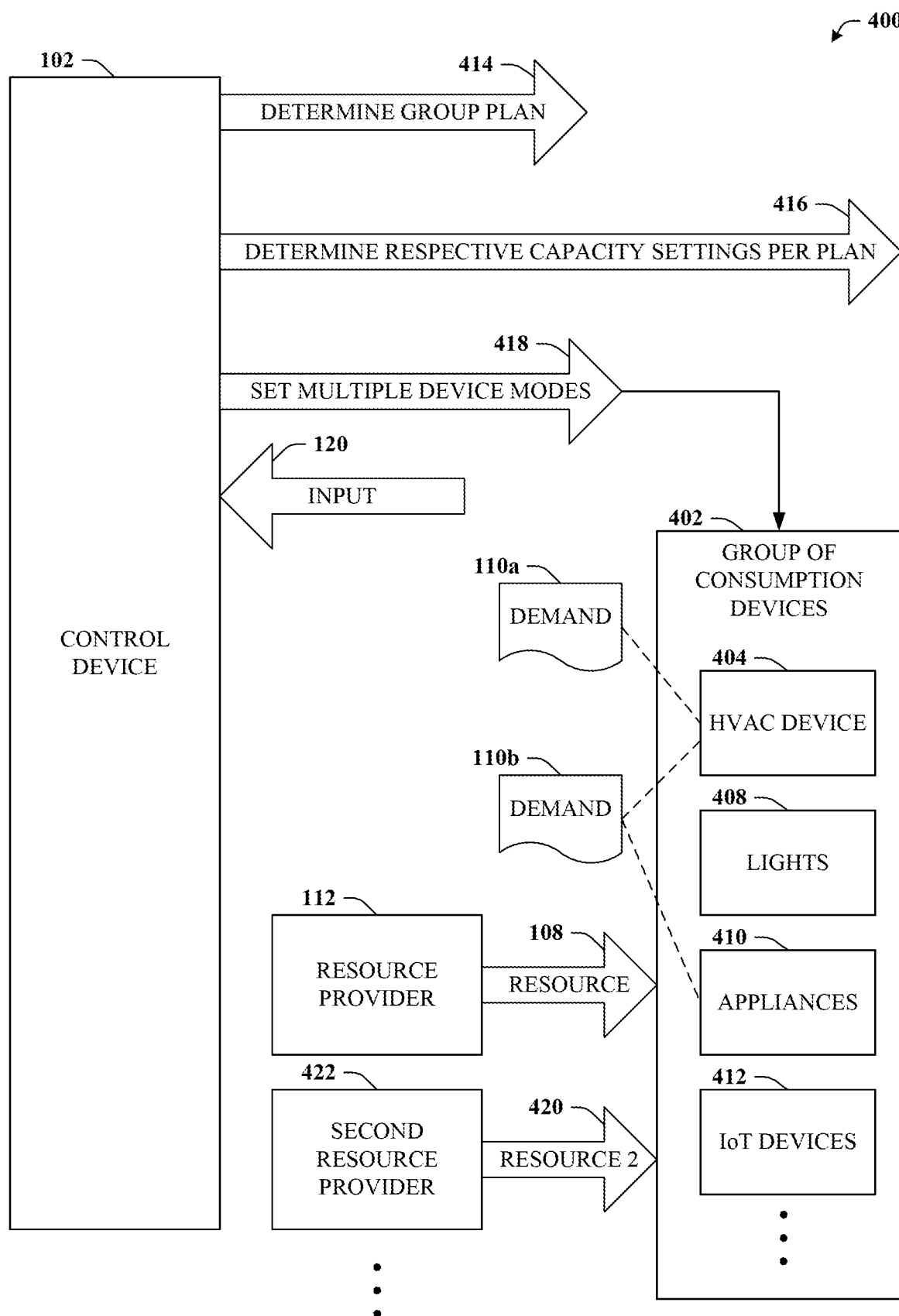
FIG. 4 illustrates a block diagram of an example system that can facilitate an efficient group plan for multiple consumption devices in accordance with one or more embodiments of the disclosed subject matter.

Referring now to FIG. 4, a block diagram of system 400 is depicted. System 400 can facilitate an efficient group plan for multiple consumption devices in accordance with one or more embodiments of the disclosed subject matter. System 400 can include all or a portion of system 100 of FIG. 1 or other suitable components or elements detailed herein. As illustrated, system 400 can include control device 102 and a group 402 of consumption devices that are configured to satisfy a respective demand (e.g., demand 110). Group 402 can include any suitable device, non-limiting examples of which can be HVAC device 404, lights 408, appliances 410, so-called Internet-of-things (IoT) devices 412, and so on.

As illustrated at reference numeral 414, control device 102 can determine a group plan for group 402. At reference numeral 414, control device 102 can determine respective capacity settings according to the group plan, and set multiple devices to selected settings, as illustrated at reference numeral 418.

In more detail, determining a group plan (e.g., at 414) can initially involve identifying suitable members of group 402. Such can include identifying what equipment is installed, identifying individual demands 110 of the various devices, prioritizing the individual demands, determining a cost-benefit analysis of under satisfying a given individual demand, determining advantageous ways to configure that equipment, and so forth. All or a portion of the above can be determined based on input 120.

As has been demonstrated in connection with consumption device 106, the inventors have observed that it is possible to achieve advantageous results by prioritizing a different objective (e.g., efficient operation) over satisfying an associated demand 110. Such might be applied in turn to each member of group 402. For instance, control device 102 can individually set multiple devices to respective modes that prioritize efficient operation or efficient consumption of resource 108 over satisfying a respective demand 110 as has been described above.

In addition, apart from merely treating each member of the group as an independent device that operates to satisfy its own independent demand, further new possibilities can be offered based on the following observations. The inventors have further observed that one member of group 402, in satisfying a respective demand 110, might impact the operation of another member of group 402. Thus, while control device 102 can in some embodiments operate to optimize settings for each member device of group 402 independently, additional benefits can be offered. For example, control device 102 can, in some embodiments, determine ways members of group 402 can intelligently work together to create a vibrant and flexible ecosystem that can prioritize or deemphasize various goals to produce advantageous results.

As a simple example to demonstrate these concepts, consider an HVAC system comprising a heating unit and a fan/blower unit that delivers tempered air produced by the heating unit. It is readily apparent that both units have different respective operational demands 110. For instance, demand 110*a* for the heating unit might be specified by a temperature set point whereas demand 110*b* for the fan might be specified as a noise level set point or a capacity/speed set point. Even though the demand 110*b* of the fan may be independent of the demand 110*a* of the heating unit (e.g., noise level set point versus temperature set point), it is apparent that changing the operational output of the fan can affect an amount or an efficiency of resource 108 being consumed by the heating unit. Hence, by relaxing the noise level set point of the fan, the heating unit might be capable of more efficient consumption.

As another example, consider another HVAC device 404 with a temperature set point demand 110*a* and an appliance 410 such as a refrigerator freezer that has a different temperature set point demand 110*b*. In satisfying demand 110*b*, the freezer generates heat that radiates into the environment tempered by HVAC device 404. Depending on weather, season, and other factors, such can be detrimental or beneficial to HVAC device 404 in satisfying demand 110*a*. It can be envisioned by giving priority to considerations other than satisfying a set point, the freezer and HVAC device 404 can work together to produce advantageous results.

For instance, suppose the temperature inside the freezer is above the set point, so the compressor is operating in an attempt to satisfy this demand. Likewise, suppose the temperature of the environment controlled by HVAC device 404 (in this case an air conditioning unit) is above the associated set point, so HVAC device 404 is also operating to satisfy the set point. In response to a DR event, control device 102 has several options and opportunities. If the freezer temperature is determined to be close enough to the associated set point, the freezer compressor can be cycled off, even though the set point goes unsatisfied. The freezer then is no longer consuming the resource, which is beneficial in terms of responding to the peak load, but the decision might be made to reduce the heat output from the freezer coils thereby reducing the load on HVAC device 404, potentially allowing HVAC device 404 to be set at a more efficient setting (e.g., a lower capacity setting 116) than would be otherwise selected (e.g., by the mechanisms 302-308).

As yet another example, consider again HVAC device 404 that consumes resource 108 to satisfy two different demands, one being temperature and the other humidity. A clothes dryer device 410 can also be a member of group 402. Typically, the exhaust of dryer device 410 is vented outside, but it is observed that this exhaust has a relatively high temperature and humidity. In managing the operations of both these devices, control device 102 can determine that, if diverted appropriately inside rather than outside, such can affect one or both of the temperature or humidity of the interior environment. Depending on the situation, control device 102 can make determinations about where to vent the exhaust, the operational output of both HVAC device 404 and dryer device 410 and the effects one has on the other, as well as priorities associated with satisfying individual demands, whether under- or over-satisfying is appropriate, and so forth.

It is further observed that HVAC device 404 and dryer device 410 might even consume different resources. For instance, suppose HVAC device 404 consumes electricity (e.g., resource 108 from resource provider 112), while dryer device 410 consumes natural gas (e.g., resource 420 from second resource provider 422). Such can dramatically change the analysis, depending on the situation. For instance, suppose a DR event occurs for resource 108, while resource 420 has a relatively low demand. Hence, consuming resource 420 in a less efficient manner can be beneficial (e.g., cost effective for the customer) as opposed to consuming resource 108 in a very efficient manner. In other words, it might be cheaper and result in fewer stresses to energy infrastructure to operate dryer device 410 even when there is no need to satisfy any demand 110b for dryer device 410. Rather, the operation can be directed to increasing the efficiency by which HVAC device 404 operates in connection with demand 110a.

Those skilled in the art will appreciate all the many permutations that are possible stemming from the innovative concepts or techniques introduced herein such as the concept of prioritizing efficient operation over satisfying a demand or set point, the concept of prioritizing efficient operation of one device over satisfying a demand of a second device, the concept of prioritizing efficient operation of one device over efficient operation of a second device, the concept of prioritizing satisfaction of a demand of one device over satisfaction of the demand of another device, and similar.

Figure 5A:
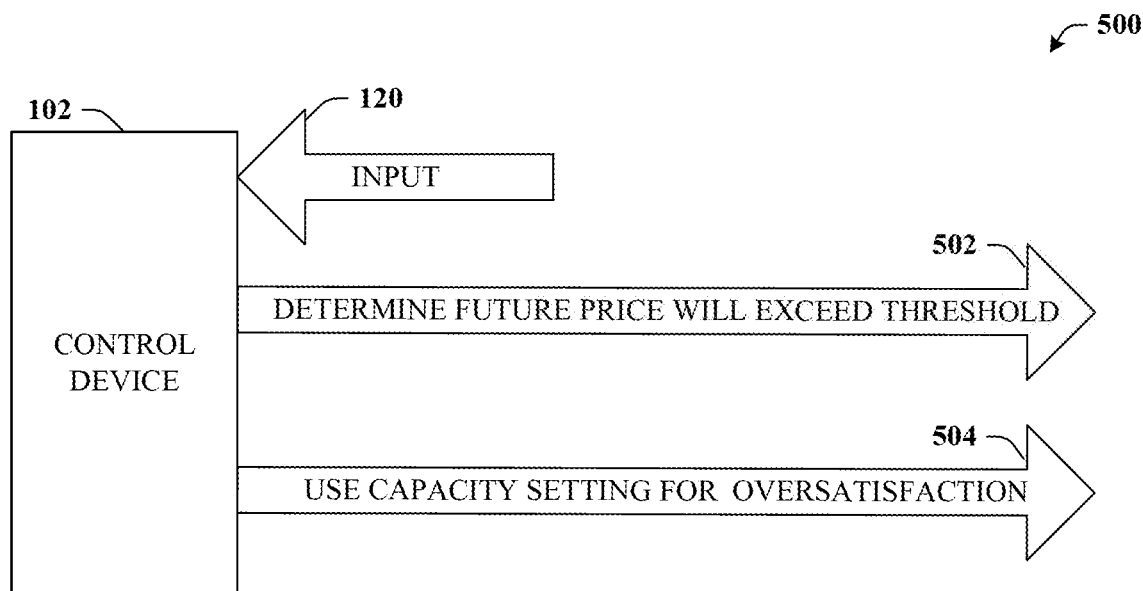
FIG. 5A illustrates a block diagram of an example system depicting concepts or techniques in connection with over satisfying the demand in accordance with one or more embodiments of the disclosed subject matter.

Turning now to FIG. 5A, a block diagram of system 500 is depicted. System 500 illustrates concepts or techniques in connection with over satisfying demand 110 in accordance with one or more embodiments of the disclosed subject matter. System 400 can include all or a portion of systems 100, 400 of FIGS. 1 and 4 or other suitable components or elements.

Much of the disclosure to this point has discussed the concept of under satisfying demand 110. For example, prioritizing efficient operation as explained above may cause a demand or set point to be under satisfied. Additionally, or alternatively, in some embodiments, control device 102 can instruct a device (e.g., consumption device 106) to perform an over satisfaction procedure. This over satisfaction procedure can comprise operating consumption device 106 according to the reduced capacity mode such that an operational output of consumption device 106 over satisfies demand 110.

One reason to do this can be in response to determining that price 114 is forecasted to exceed the defined price threshold at some future time. Such is illustrated as determination 502 that can be based on input 120 such as weather forecasts, a resource rate schedule that forecasts or suggests price 114 at the future time, or the like. Capacity setting for the over satisfaction procedure can be determined and implemented, as illustrated at reference numeral 504.

Being apprised of a DR event or the like in advance can facilitate proactive measures. For example, a home environment can be overheated or overcooled in advance to ease the stresses that will result when the DR event occurs. Significantly, this over satisfaction technique can be according to the reduced capacity setting that is determined to operate in an efficient manner rather than according to nominal operational modes, which can distinguish from other techniques of pre-heating or pre-cooling an environment. In some embodiments, the over satisfaction procedure can be limited by the same or different satisfaction margin 122 introduced at FIG. 1 in connection with scenarios in which the demand is under satisfied.

Figure 5B:
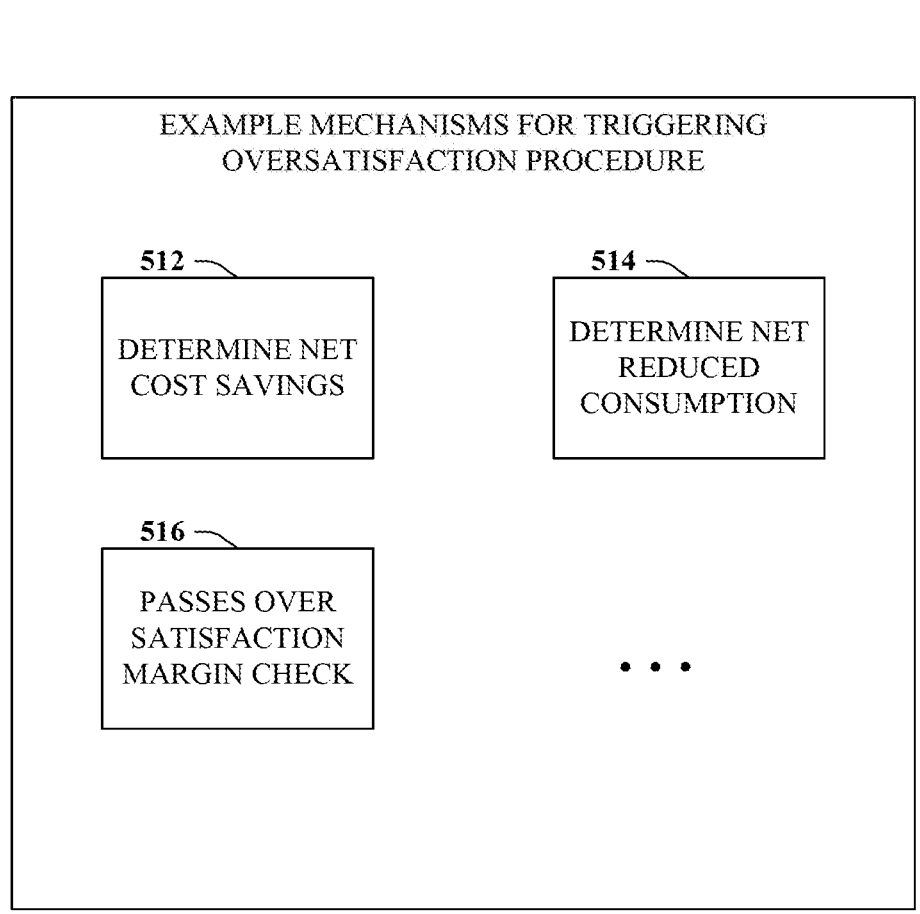
FIG. 5B depicts a block diagram illustrating example mechanisms for triggering the over satisfaction procedure in accordance with one or more embodiments of the disclosed subject matter.

Regarding FIG. 5B, a block diagram 510 is illustrated. Diagram 510 provides example mechanisms for triggering the over satisfaction procedure in accordance with one or more embodiments of the disclosed subject matter. For example, in addition to determining that a future price will exceed the defined price threshold, as discussed in connection with FIG. 5A, the over satisfaction procedure can be initiated further based on one or more of the following.

As illustrated by reference numeral 512, the over satisfaction procedure can be initiated further based on a determination that over satisfying the operational demand prior to the future time is likely to result in a net cost savings. For instance, the cost to over satisfy does not exceed the savings or other benefits derived, which can be offset by a risk factor that the forecast is not guaranteed.

According to reference numeral 514, the over satisfaction procedure can be initiated further based on a determination that over satisfying the operational demand prior to the target time is likely to result in a net reduction of the resource being consumed. As still another example indicated by reference numeral 516, the over satisfaction procedure can be initiated further based on a determination that over satisfying the operational demand prior to the future time is not likely to violate a satisfaction margin (e.g., satisfaction margin 122) that identifies an acceptable margin by which operation of the consumption device in the reduced capacity mode is permitted to over satisfy the operational demand.

Figure 6A:
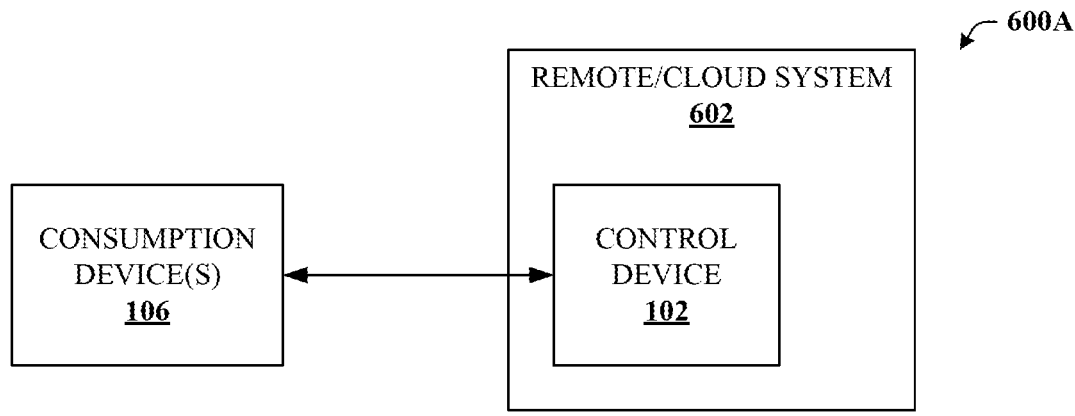
FIGS. 6A-C illustrate block diagrams of example architectural implementations that can be employed in accordance with one or more embodiments of the disclosed subject matter.
Figure 6B:
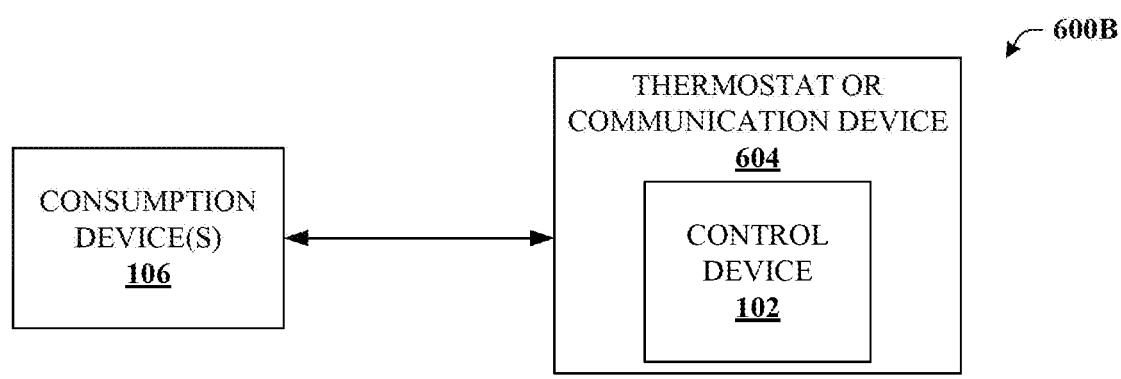
Figure 6C:
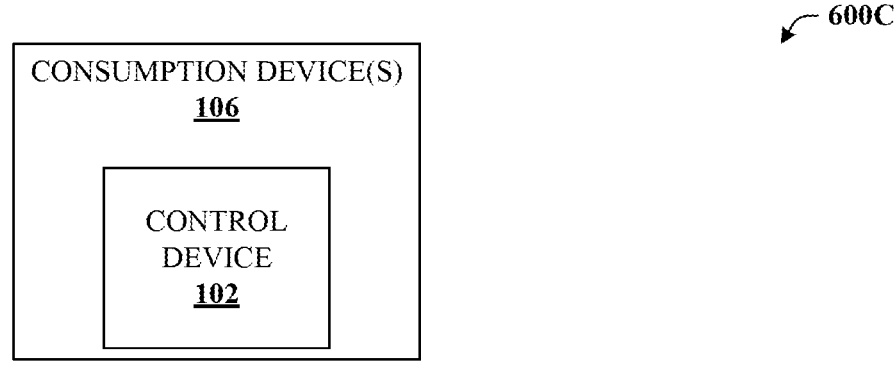

Turning now to FIGS. 6A-C, various block diagrams 600A-C of example architectural implementations are illustrated in accordance with one or more embodiments of the disclosed subject matter.

For example, block diagram 600A depicts an example architectural design in which all or portions of control device 102 are remotely located in a remote or cloud system 602. Such can be contrasted with architectures depicted in FIGS. 6B and 6C in which control device 102 can be a component of local thermostat or communication device.

For instance, block diagram 600B depicts an example architectural design in which all or portions of control device 102 are included in a thermostat or communication device 604. As noted, thermostat or other communication device 604 can be coupled to a user interface (e.g., UI device 104) that is accessible to occupants. In some embodiments, device 604 can be a mobile device or other communication apparatus.

Block diagram 600C depicts an example architectural design in which all or portions of control device 102 are included in consumption device 106.

Example Methods

Figure 7:
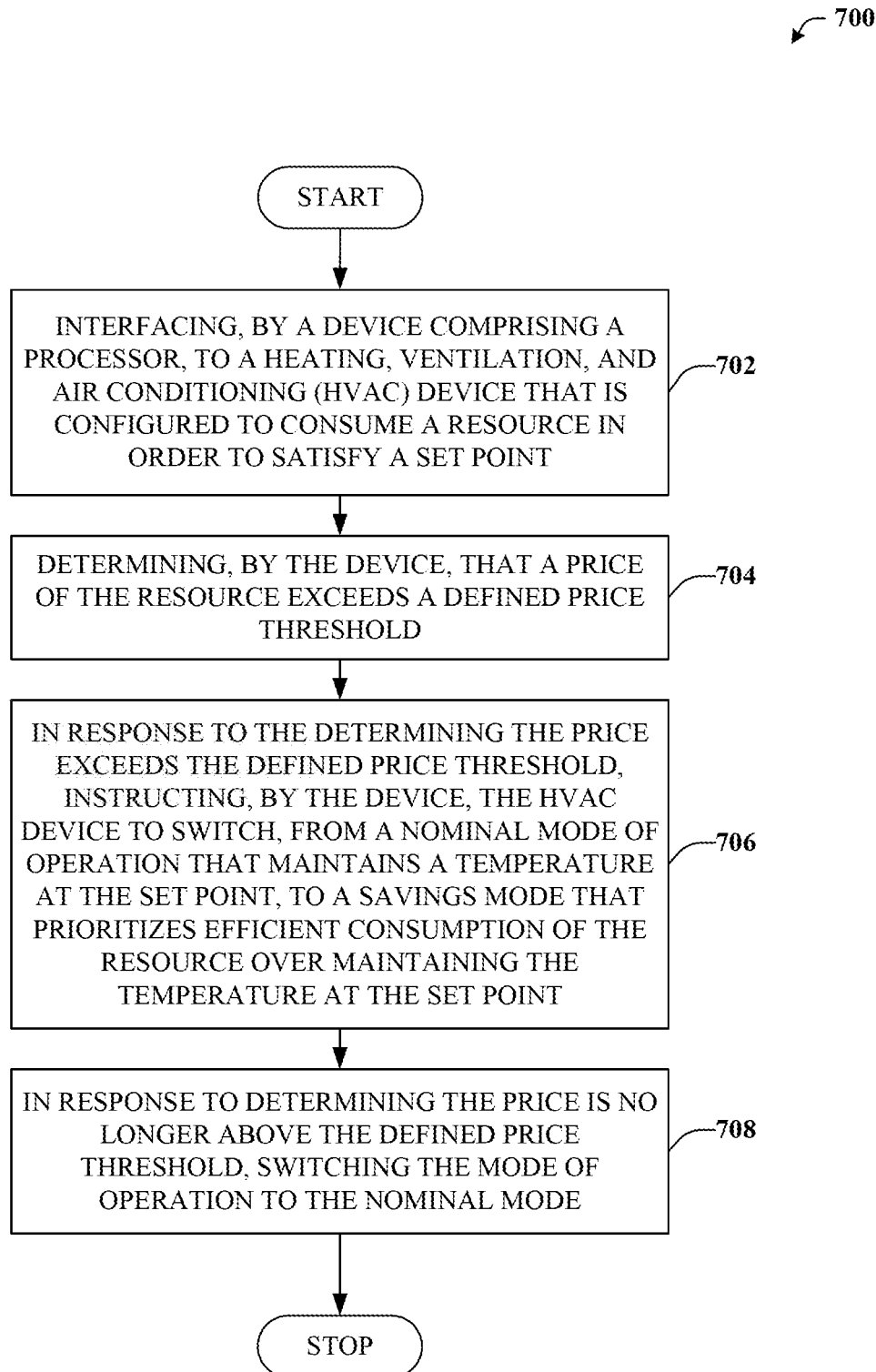
FIG. 7 illustrates a flow diagram of an example, non-limiting computer-implemented method that can, e.g., in response to a demand response (DR) event, facilitate prioritizing efficient operation of a heating, ventilation, and air conditioning (HVAC) device over satisfying a set point in accordance with one or more embodiments of the disclosed subject matter.
Figure 8:
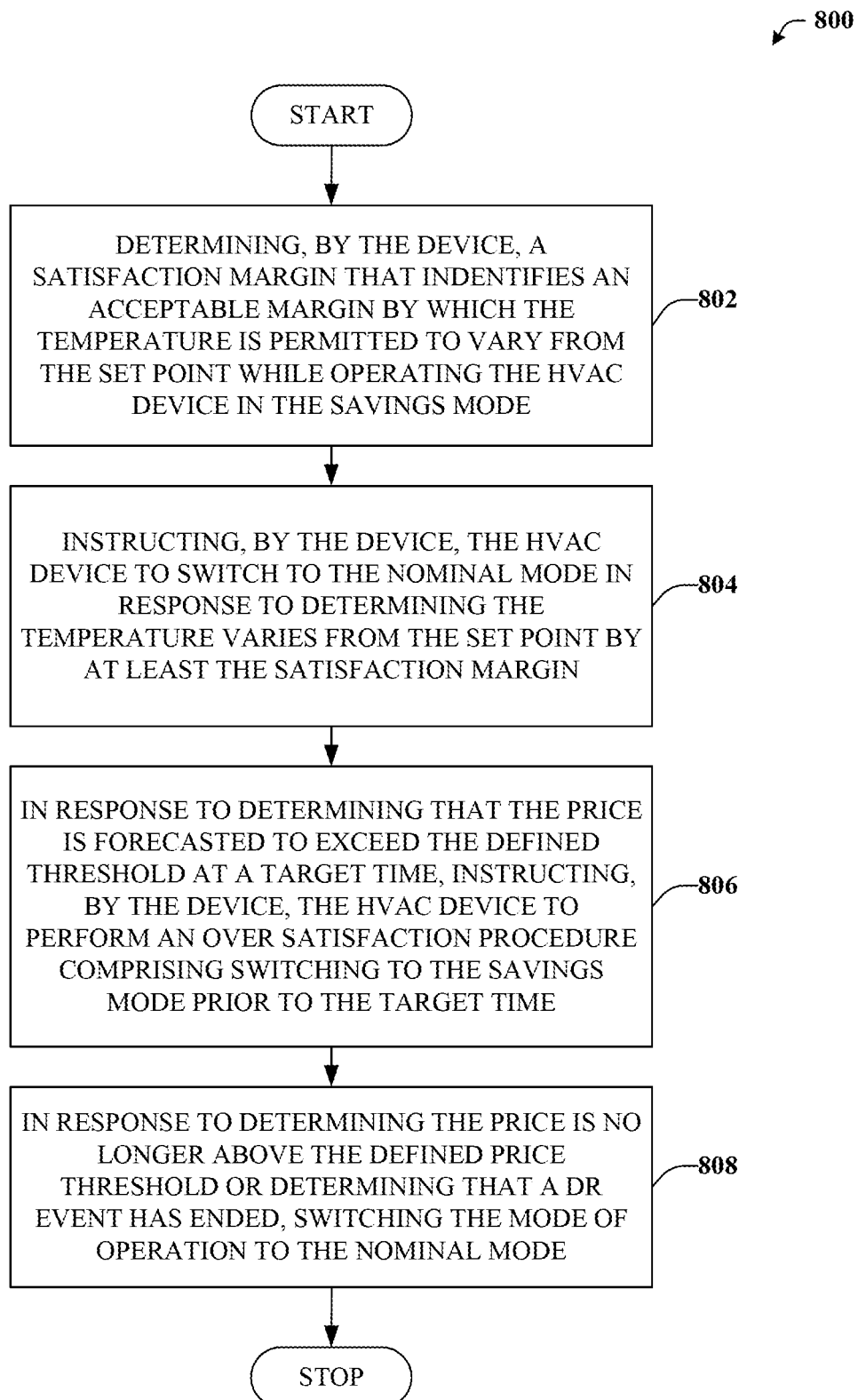
FIG. 8 illustrates a flow diagram of an example, non-limiting computer-implemented method that can provide for additional aspects or elements in connection with facilitating prioritizing efficient operation of the HVAC device over satisfying the set point in accordance with one or more embodiments of the disclosed subject matter.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts can occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

FIG. 7 illustrates a flow diagram 700 of an example, non-limiting computer-implemented method that can, e.g., in response to a demand response (DR) event, facilitate prioritizing efficient operation of a heating, ventilation, and air conditioning (HVAC) device over satisfying a set point in accordance with one or more embodiments of the disclosed subject matter. For example, at reference numeral 702, a device (e.g., control device 102) operatively coupled to a processor can interface to the HVAC device. The HVAC device can be configured to consume a resource in order to satisfy a set point.

At reference numeral 704, the device can determine that a price of the resource exceeds a defined price threshold. In some embodiments, this determination can be based on a signal received via an OpenADR network or the like indicating a price of the resource. In other embodiments, this determination can be based on a signal from a user interface device such as a signal that indicates a user preference. In other words, a user can be provided an opportunity to effectively create his or her own DR event and/or selectively decide to take advantage of potential cost savings or resource conservation results afforded by the disclosed techniques.

At reference numeral 706, in response to the determining the price exceeds the defined price threshold, the device can instruct the HVAC device to switch, from a nominal mode of operation that maintains a temperature at the set point, to a savings mode that prioritizes efficient consumption of the resource over maintaining the temperature at the set point. In other words, instead of attempting to operate the HVAC system in a manner consistent with maintaining a set point, the HVAC system can be instead operated in a manner that is determined to reduce consumption of the resource, even if the set point is not maintained.

At reference numeral 708, in response to determining the price is no longer above the defined threshold, the device can instruct the HVAC device to switch the mode of operation to the nominal mode.

Turning now to FIG. 8, illustrated is a flow diagram 800 of an example, non-limiting computer-implemented method that can provide for additional aspects or elements in connection with facilitating prioritizing efficient operation of the HVAC device over satisfying the set point in accordance with one or more embodiments of the disclosed subject matter. For example, at reference numeral 802, a device (e.g., control device 102) can determine a satisfaction margin that identifies an acceptable margin by which the temperature is permitted to vary from the set point while operating the HVAC device in the savings mode.

At reference numeral 804, the device can instruct the HVAC device to switch to the nominal mode in response to determining the temperature varies from the set point by at least the satisfaction margin. In other words, the satisfaction margin can operate as a reduced comfort threshold that can reverse the priorities of operation, if necessary.

At reference numeral 806, in response to determining that the price is forecasted to exceed the defined threshold at a target time, the device can instruct the HVAC device to perform an over satisfaction procedure comprising switching to the savings mode prior to the target time. Hence, the HVAC device can be operated in the savings mode, even when there is no demand that is unsatisfied, effectively pre-heating or pre-cooling an environment.

At reference numeral 808, in response to determining the price is no longer above the defined threshold, the device can instruct the HVAC device to switch the mode of operation to the nominal mode. In some embodiments, the device can instruct the HVAC device to switch to the nominal mode in response to receiving an indication or otherwise determining that a DR event has ended.

Example Operating Environments

An example embodiment can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 9, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 9:
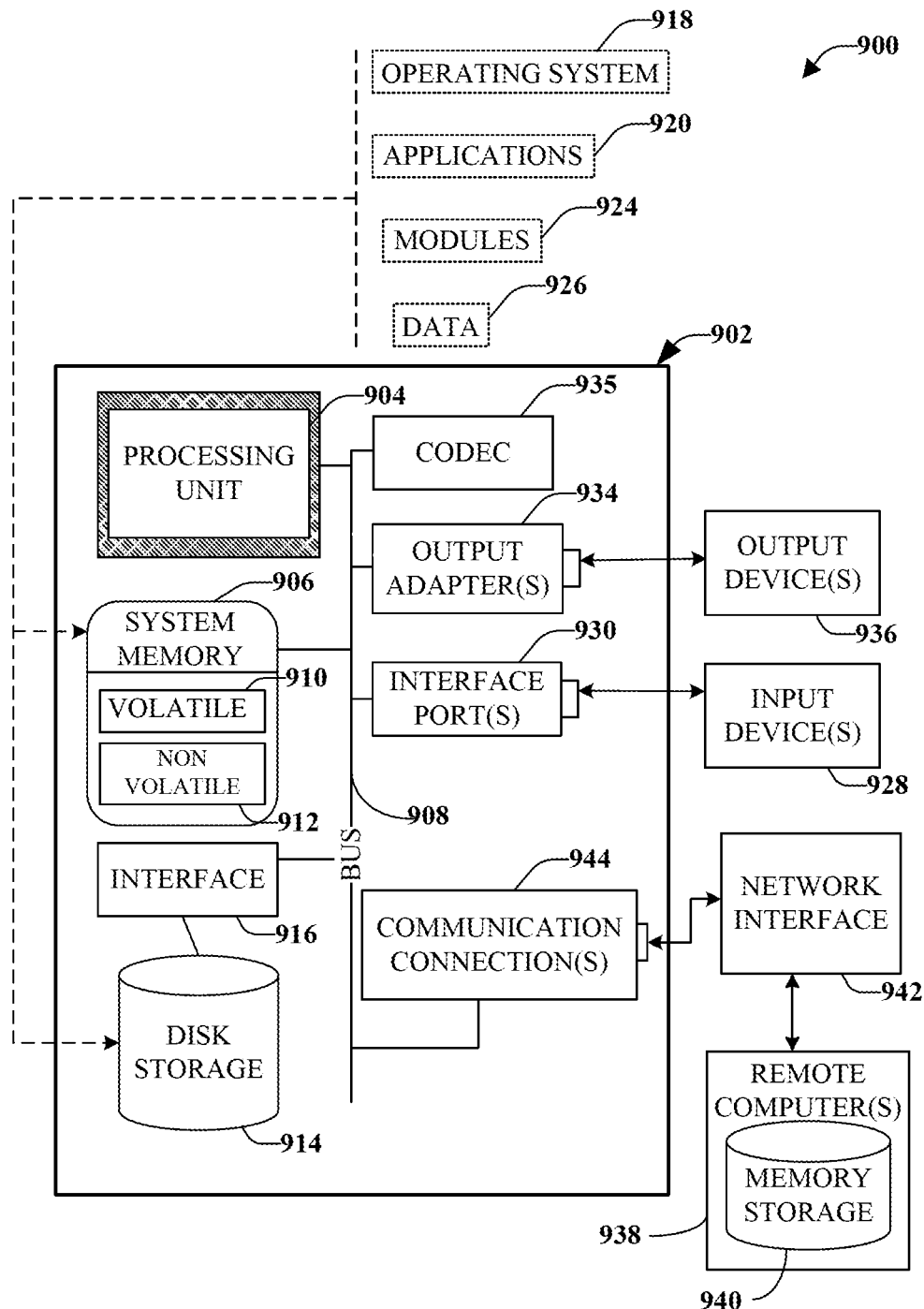
FIG. 9 illustrates a block diagram of an example, non-limiting operating environment in which one or more embodiments described herein can be facilitated.

With reference to FIG. 9, an example environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors such as an ARM Cortex A7 processor that can be implemented on a Digi ConnectCore 6UL module or the like. Dual microprocessors and other multiprocessor architectures also can be employed as the processing unit 904.

The system bus 908 can be any of several types of bus structure(s) including the memory bus or memory controller, a peripheral bus or external bus, or a local bus using any variety of available bus architectures or protocols including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI) Serial Peripheral Interface (SPI), inter-integrated circuit (I2C), embedded Multi-Media Controller (eMMC), Universal Synchronous/Asynchronous Receiver/Transmitter (USART), Secure Digital (SD) Double Data Rate Type 3 (DDR3), and Open NAND Flash interface (ONFI).

The system memory 906 includes volatile memory 910 and non-volatile memory 912, which can employ one or more of the disclosed memory architectures, in various embodiments. The basic input/output system (BIOS), containing the basic routines to transfer information between elements within the computer 902, such as during start-up, is stored in non-volatile memory 912. In addition, according to present innovations, codec 935 can include at least one of an encoder or decoder, wherein the at least one of an encoder or decoder can consist of hardware, software, or a combination of hardware and software. Although, codec 935 is depicted as a separate component, codec 935 can be contained within non-volatile memory 912. By way of illustration, and not limitation, non-volatile memory 912 can include read only memory (ROM), programmable ROM (PROM), electrically programmable ROM (EPROM), electrically erasable programmable ROM (EEPROM), Flash memory, 3D Flash memory, or resistive memory such as resistive random-access memory (RRAM). Non-volatile memory 912 can employ one or more of the disclosed memory devices, in at least some embodiments. Moreover, non-volatile memory 912 can be computer memory (e.g., physically integrated with computer 902 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 910 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 902 can also include removable/non-removable, volatile/non-volatile computer storage medium. FIG. 9 illustrates, for example, disk storage 914. Disk storage 914 includes, but is not limited to, devices like a magnetic disk drive, solid state disk (SSD), flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 or transmitted to the server or application. The user can be provided the opportunity to opt-in or opt-out of having such information collected or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a resistive touch pad, capacitive touch pad, a pointing device such as a mouse, trackball, stylus, touch pad, keyboard, microphone, joystick, or game pad; a satellite dish, a scanner, a TV tuner card, a digital camera, a digital video camera, a web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port can be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor-based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A control device for controlling consumption of a resource, the control device comprising:
a processor; and
a memory that stores executable instructions that, when executed by the processor, cause the control device to at least:
receive real time information that indicates a price of the resource;
determine from the real time information that the price of the resource has exceeded a defined price threshold;
in response to determining the price has exceeded the defined price threshold:
determine a difference in the price and the defined price threshold;
provide the difference in the price and the defined price threshold as input to a function to determine an amount to reduce a first output capacity of a heating, ventilation, and air conditioning (HVAC) device, wherein the first output capacity reduced by the amount is a reduced non-zero output capacity; and
instruct the HVAC device to continue to consume the resource but operate at the reduced non-zero output capacity, without adjustment of an HVAC set point, and without implementation of a setback in which the HVAC device is shut off for a time in order to satisfy the setback.

2. The control device of claim 1, wherein the control device is caused to instruct the HVAC device to switch from a first mode in which the HVAC device operates at the first output capacity, directly to a second mode in which the HVAC device operates at the reduced non-zero output capacity.

3. The control device of claim 1, wherein the executable instructions, when executed by the processor, cause the control device to instruct an appliance to switch operation from a first state to a second state in which appliance consumption of the resource or another resource is reduced.

4. The control device of claim 1, wherein the executable instructions, when executed by the processor, cause the control device to further determine the amount to reduce the first output capacity of the HVAC device based on user input to the control device or the HVAC device.

5. The control device of claim 1, wherein the executable instructions, when executed by the processor, cause the control device to further at least:

receive further real time information that indicates an updated price of the resource;
determine from the further real time information that the updated price of the resource is less than or equal to the defined price threshold, as the HVAC device operates at the reduced non-zero output capacity; and in response thereto,
instruct the HVAC device to again operate at the first output capacity.

6. The control device of claim 1, wherein the executable instructions, when executed by the processor, cause the control device to further at least:
determine that the set point is under satisfied by more than an acceptable margin, as the HVAC device operates at the reduced non-zero output capacity; and in response thereto,
instruct the HVAC device to again operate at the first output capacity.

7. A method comprising:
operating a heating, ventilation, and air conditioning (HVAC) device at a first output capacity in order to satisfy a set point, wherein the HVAC device consumes a resource while operating;
receiving real time information that indicates a price of the resource;
determining from the real time information that the price of the resource has exceeded a defined price threshold;
in response to determining the price has exceeded the defined price threshold:
determining a difference in the price and the defined price threshold;
providing the difference in the price and the defined price threshold as input to a function to determine an amount to reduce the first output capacity of the HVAC device, wherein the first output capacity reduced by the amount is a reduced non-zero output capacity; and
operating the HVAC device to continue to consume the resource but at the reduced non-zero output capacity that is less than the first output capacity, without adjustment of the set point, and without implementation of a setback in which the HVAC device is shut off for a time in order to satisfy the setback.

8. The method of claim 7, wherein the HVAC device is operated to switch from a first mode in which the HVAC device operates at the first output capacity, to a second mode in which the HVAC device operates at the reduced non-zero output capacity.

9. The method of claim 7, wherein the method further comprises instructing an appliance to switch operation from a first state to a second state in which appliance consumption of the resource or another resource is reduced.

10. The method of claim 7, wherein the method further comprises determining the amount to reduce the first output capacity of the HVAC device based on user input to a control device or the HVAC device.

11. The method of claim 7, wherein the method further comprises:
receiving further real time information that indicates an updated price of the resource;
determining from the further real time information that the updated price of the resource is less than or equal to the defined price threshold, as the HVAC device operates at the reduced non-zero output capacity; and in response thereto,
operating the HVAC device again at the first output capacity.

12. The method of claim 7, wherein the method further comprises:
    determining that the set point is under satisfied by more than an acceptable margin, as the HVAC device operates at the reduced non-zero output capacity; and in response thereto,
    operating the HVAC device again at the first output capacity.

13. A non-transitory storage medium comprising instructions executable by a processor, wherein the processor implements a method in response to executing the instructions, the method comprising:
    operating a heating, ventilation, and air conditioning (HVAC) device to consume a resource, and at a first output capacity in order to satisfy a set point;
    receiving real time information that indicates a price of the resource;
    determining from the real time information that the price of the resource has exceeded a defined price threshold;
    in response to determining the price has exceeded the defined price threshold:
        determining a difference in the price and the defined price threshold;
        providing the difference in the price and the defined price threshold as input to a function to determine an amount to reduce the first output capacity of the HVAC device, wherein the first output capacity reduced by the amount is a reduced non-zero output capacity; and
        operating the HVAC device to continue to consume the resource but at the reduced non-zero output capacity that is less than the first output capacity, without adjustment of the set point, and without implementation of a setback in which the HVAC device is shut off for a time in order to satisfy the setback.

14. The non-transitory storage medium of claim 13, wherein the HVAC device is operated to switch from a first mode in which the HVAC device operates at the first output capacity, to a second mode in which the HVAC device operates at the reduced non-zero output capacity.

15. The non-transitory storage medium of claim 13, wherein the wherein the method further comprises instructing an appliance to switch operation from a first state to a second state in which appliance consumption of the resource or another resource is reduced.

16. The non-transitory storage medium of claim 13, wherein the method further comprises determining the amount to reduce the first output capacity of the HVAC device based on user input to a control device or the HVAC device.

17. The non-transitory storage medium of claim 13, wherein the method further comprises:
    receiving further real time information that indicates an updated price of the resource;
    determining from the further real time information that the updated price of the resource is less than or equal to the defined price threshold, as the HVAC device operates at the reduced non-zero output capacity; and in response thereto,
    operating the HVAC device again at the first output capacity.

* * * * *